Figure 1:
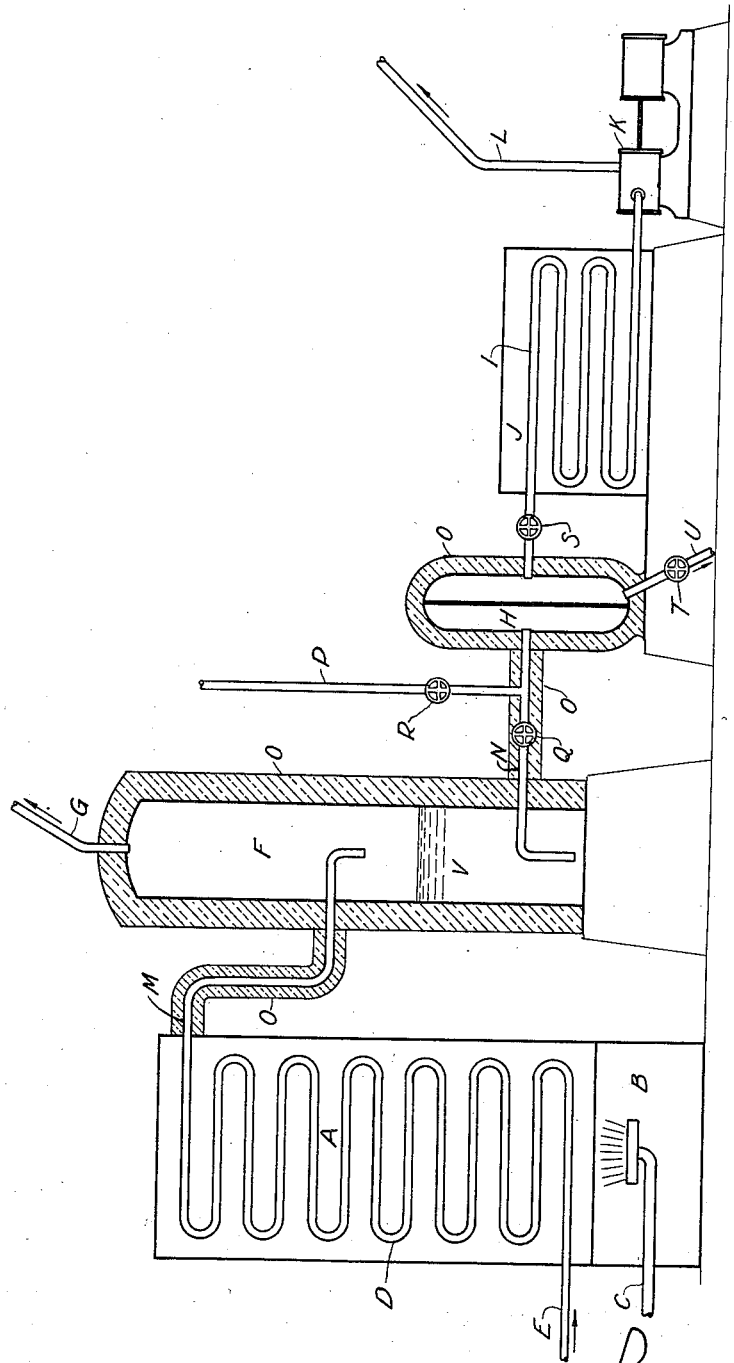

Aug. 11, 1931.     P. W. PRUTZMAN     1,818,274
HOT FILTRATION OF DECOLORIZED OILS
Filed April 20, 1927

Paul W. Prutzman
INVENTOR

Patented Aug. 11, 1931

1,818,274

UNITED STATES PATENT OFFICE

PAUL W. PRUTZMAN, OF LOS ANGELES, CALIFORNIA

HOT FILTRATION OF DECOLORIZED OILS

Application filed April 20, 1927. Serial No. 185,262.

My invention relates to the art of decolorizing oils with solid adsorbents such as animal and vegetable chars, fuller's earths and other clays, magnesium silicates and the water-insoluble bodies resulting from the treatment of montmorillonite and similar clay-like minerals, with sulfuric acid.

My invention relates more particularly to that treatment of mineral lubricating oils with the above bodies which consists in finely comminuting the decolorizing agent, intermixing it with the oil to be treated, and heating the mixture to temperatures ranging from 350° F. up to or even beyond the normal-pressure boiling point of the oil.

My invention relates specifically to a method of separating the spent decolorizing agent from the oil in such manner as to take advantage of the full decolorizing power of the agent and to avoid any back-up or darkening of color caused by leakage of adsorbed coloring matter back into the oil after the completion of the decolorizing reaction itself.

It is well known that oils may be partially decolorized and otherwise purified by the treatment above set forth and it is also well known that with many of the above mentioned adsorbent bodies the decolorizing value increases as the temperature is raised. It is therefore common practice to carry out this decolorizing step at a relatively high temperature under such conditions that air will not be admitted to contact with the oil while at such high temperature, because of the powerful oxidizing effect of the air on such heated oil and the consequent degradation of the color and the formation of oxidizing bodies having a disagreeable odor. It is also common practice to cool the mixture of oil and spent decolorant (after the completion of the decolorizing reaction and prior to the separation of the oil of the spent decolorant) as rapidly as possible and to a temperature much below the most efficient decolorizing temperature. The object of this cooling and the object of making the cooling a rapid rather than a slow process is to prevent the coloring matter once taken up by the adsorbent from being released therefrom and from passing back into the purified oil. The reaction between the oil and the decolorant is a balanced reaction, in which the power of the adsorbent to adsorb and retain the coloring matter increases with rising and decreases with falling temperature.

I have discovered that if the cooling step heretofore used be entirely avoided and the mixture of purified oil and of spent decolorant be separated into its two constituents (as by a filtration step) at the temperature most nearly approaching the decolorizing temperature which it is mechanically possible to obtain, the leakage of tinctorial bodies from the spent decolorant into the purified oil may be entirely prevented and an oil of much better and more stable color, and having a better odor will be produced than would be obtained, with the same oil and dosage of adsorbent, if the mixture of purified oil and spent adsorbent were cooled prior to such separation step.

In the practice of my invention I am not restricted to any specific means for effecting the separation of the oil from the spent adsorbent. My invention lies strictly in the step of separating, prior to any avoidable cooling, the solid from the liquid constituent of the mix which results from the heating together of an oil and a solid decolorant, this step being directly contrary to present practice and being productive of the valuable and desirable results aforesaid.

While I do not wish in any sense to limit my invention to the apparatus described, I show in the attached drawing and the following description a form of apparatus which may be used for the carrying out of my invention, in which all parts except the insulation are such as have hitherto been used for similar purposes, and in which the novelty lies solely in the manner in which these parts are caused to function.

In the drawing, which will be understood to be entirely diagrammatic, A is a heater provided with a fire box B and a source of heat C and with the pipe coil D in which the mixture of oil and solid adsorbent is brought to the desired temperature. This may be any temperature preferred by the operator, the decolorizing step being no part of my present invention. The application of my invention will not, however, produce a valuable result unless the said temperature is 350° Fahr. or higher, and further, the higher the temperature is raised in the heating step the greater will be the necessity for and the economy resulting from the application of my invention. Without, therefore, limiting myself to any specific temperature except the said minimum of 350° Fahr., I would recommend heating to the following temperatures: in the case of light lubricating oils, 250° to 500° Fahr.; in the case of heavy distilled lubricating oils, 450° to 600° Fahr.; in the case of reduced lubricating oils made directly from the crude, 500° to 650° Fahr. The pipe coil D is supplied at the point E with a mixture of oil and decolorant by any convenient means from any convenient source of supply, not shown.

The mixture of oil and decolorant is passed to the evaporator F where any vapors of water and oil which may be generated during the heating of the mix are allowed to escape through the vent pipe G (these vapors may be condensed if desired) while the purified oil containing the spent adsorbent and freed from entrained vapors falls to the bottom of the evaporator F and forms a pool of liquid as indicated at V. From this pool the mixture of oil and spent decolorant is drawn into the filter H by the suction produced by means of the wet vacuum pump K, the oil preferably passing in its travel from the filter press to the suction of such vacuum pump through the cooling coil I immersed in the water holding tank J by which such oil is cooled to a temperature not higher than 300° F. and preferably to a much lower temperature, as for instance 200° F. for a heavy viscous oil and 150° F. for a light and relatively non-viscous oil. The discharge from this wet vacuum pump, which will consist of oil together with traces of air and vapors entrained in the oil, may be discharged through the pipe L to a centrifugal machine for the removal of the last traces of entrained matter or direct to a storage tank as may be preferred, the final treatment and disposal of the treated oil being no part of my present invention. The purpose of this cooling is to avoid oxidation of the oil after its separation from the spent decolorant.

The line M which connects the pipe coil D with the evaporator F should be very heavily lagged with heat insulating material, as should also the evaporator itself, the filter shell of whatever type may be used, and the line N which conducts mixture from the evaporator to the filter. This insulation on the said pipes, filter and evaporator is indicated at O—O—O.

It will be understood that any type of filter press which may be lagged so as not to radiate any material quantity of heat while in operation may be used, the manner of mechanically separating the spent adsorbent from the oil being no part of my present invention.

It should be borne in mind by the operator that where temperatures materially higher than 350° F. are carried in the filter press it will not be safe to open such press (for the purpose of cleaning and removing the cake of spent decolorant) without reducing the temperature of such cake, as otherwise a spontaneous ignition of the contents of the press may take place when air is admitted. It is therefore recommended that prior to opening the press its contents be cooled by passing therethrough either a sufficient quantity of relatively cool steam, that is to say steam only slightly above its saturation point, or a small quantity of cool wash oil of some suitable kind. Either steam or wash oil may be admitted through the pipe P by closing the valve Q and opening the valve R and this oil or steam may be prevented from entering the cooling coil I by closing the valve S and opening the valve T. The cooling medium may then be discharged to a drain or to a point of storage for later recovery through the pipe U. The use of steam for this purpose is desirable inasmuch as at the very high temperatures which is proposed to carry in the press a much more complete cleaning of the filter cake may be brought about than is possible where the filter is operated at a lower temperature, and thus the loss of oil by entrainment in the cake may be reduced to the minimum. In such case the steam from the press would be carried to a point of separation of oil from water, the oil separating from the steam or its condensate being finished filtered oil which may be mixed with the oil discharged from L.

I do not claim as my invention the mixing of oil with a comminuted decolorant for the decolorizing of the oil, nor the heating of the oil with the decolorant to any specified temperature or to any temperature (though, as aforesaid, it does not produce a valuable result unless the heating is carried to or above a temperature of 350° Fahr.) nor the separation of the mixture of purified air and spent decolorant from the vapors generated in the heater, nor the described means nor any particular means for separating the purified oil from the spent decolorant. My invention resides in the separation of the purified oil from the spent decolorant at the temperature most nearly approximating the temperature attained in the heating means obtainable by insulation of the apparatus intermediate between the heating means and the filtration means with commercial insulating coverings; the avoidance of any deliberate and intentional cooling between the heating means and the filtration means; the cooling of the filtered oil after such oil leaves the filter or other separation means, and the steaming or other cooling of the filter and its contained cake of spent adsorbent, prior to the opening of the filter for the cleaning thereof, to a temperature which will prevent the contents of such filter from spontaneously igniting on contact with the air.

I claim as my invention:

1. The continuous method of decolorizing mineral lubricating oil with solid adsorbent decolorant, comprising applying to a flow stream of the oil the following steps in the order stated: heating a mixture of said oil and said decolorant to a temperature, not less than 350° F. but below substantial cracking temperatures, at which vapors are evolved; separating said vapors and any accompanying steam from said mixture while substantially preventing reduction of the temperature of said mixture, other than that due to evolution of vapors therefrom; separating the spent decolorant from said devaporized mixture by filtration without material further lowering of said temperature; cooling the separated oil as a step succeeding the last said separation, and artificially cooling the separated spent decolorant prior to the exposure of same to atmospheric air.

2. The continuous method of decolorizing mineral lubricating oil with solid adsorbent decolorant, comprising applying to a flow stream of the oil the following steps in the order stated: heating a mixture of said oil and said decolorant to a temperature, not less than 350° F. but below substantially cracking temperatures, at which vapors are evolved; separating said vapors and any accompanying steam from said mixture while substantially preventing reduction of the temperature of said mixture other than that due to evolution of vapors therefrom; separating the spent decolorant from said devaporized mixture by filtration without material further lowering of said temperature, and cooling the separated oil as a step succeeding the last said separation.

3. The continuous method of decolorizing mineral lubricating oil with solid adsorbent decolorant, comprising applying to a flow stream of the oil the following steps in the order stated: heating a mixture of said oil and said decolorant to a temperature, not less than 350° F. but below substantially cracking temperatures, at which vapors are evolved; separating said vapors and any accompanying steam from said mixture while substantially preventing reduction of the temperature of said mixture other than that due to the evolution of vapors therefrom, and separating the spent decolorant from said devaporized mixture by filtration without material further lowering of said temperature.

4. A method of decolorizing mineral lubricating oil with solid adsorptive decolorant, comprising in combination: heating a mixture of said oil and said decolorant to a temperature, not less than 350° F. but below substantially cracking temperatures, at which vapors are evolved; separating said vapors from said mixture without material lowering of the temperature of said mixture other than that due to the evolution of vapors therefrom; mechanically separating the spent decolorant from said devaporized mixture without material further lowering of said temperature; cooling the separated oil as a step succeeding the last said separation, and cooling the separated spent adsorbent prior to the exposure of the same to atmospheric air by the passage therethrough of a nonoxidizing fluid at a temperature lower than that of the adsorbent.

5. A method substantially as and for the purpose set forth in claim 4, in which the cooling fluid is steam at a temperature lower than that of the adsorbent.

In witness that I claim the foregoing I have hereunto subscribed my name this 11th day of April, 1927.

PAUL W. PRUTZMAN.